US010217570B2

(12) United States Patent
Matsuura et al.

(10) Patent No.: US 10,217,570 B2
(45) Date of Patent: Feb. 26, 2019

(54) ELECTRIC STORAGE DEVICE

(71) Applicant: JTEKT CORPORATION, Osaka-shi (JP)

(72) Inventors: Takashi Matsuura, Konan (JP); Koji Nishi, Anjo (JP); Takumi Mio, Kariya (JP); Yukihiro Komatsubara, Chiryu (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/298,879

(22) Filed: Oct. 20, 2016

(65) Prior Publication Data

US 2017/0117101 A1    Apr. 27, 2017

(30) Foreign Application Priority Data

Oct. 22, 2015    (JP) .................................. 2015-207783

(51) Int. Cl.
| H01G 11/06 | (2013.01) |
| H01G 11/58 | (2013.01) |
| H01G 11/14 | (2013.01) |
| H01G 11/32 | (2013.01) |
| H01G 11/52 | (2013.01) |
| H01G 11/78 | (2013.01) |
| H01M 10/04 | (2006.01) |
| H01M 2/10 | (2006.01) |
| H01G 11/34 | (2013.01) |
| H01G 11/36 | (2013.01) |
| H01G 11/38 | (2013.01) |

(Continued)

(52) U.S. Cl.
CPC ............. *H01G 11/14* (2013.01); *H01G 11/06* (2013.01); *H01G 11/32* (2013.01); *H01G 11/52* (2013.01); *H01G 11/58* (2013.01); *H01G 11/78* (2013.01); *H01M 2/1016* (2013.01); *H01M 10/0413* (2013.01); *H01M 10/0436* (2013.01); *H01G 11/34* (2013.01); *H01G 11/36* (2013.01); *H01G 11/38* (2013.01); *H01M 10/0525* (2013.01); *H01M 10/0585* (2013.01); *Y02E 60/13* (2013.01)

(58) Field of Classification Search
CPC ................................ H01G 11/58; H01G 11/06
See application file for complete search history.

(56) References Cited

U.S. PATENT DOCUMENTS

| 6,556,424 B2 * | 4/2003 | O'Brien | ................ H01G 9/155 |
| | | | 361/502 |
| 2009/0197175 A1 * | 8/2009 | Nagai | .................... H01G 9/016 |
| | | | 429/231.1 |

(Continued)

FOREIGN PATENT DOCUMENTS

JP        6-84544        3/1994

*Primary Examiner* — Eric Thomas
(74) *Attorney, Agent, or Firm* — Oblon, McClelland, Maier & Neustadt, L.L.P.

(57) ABSTRACT

An electric storage device has an electrode body and a housing body. The electrode body has a plurality of positive plates and a plurality of negative plates. The positive plates and the negative plates are alternately stacked on each other via separators. The housing body houses the electrode body together with an ion conductor. The electric storage device is provided with a magnetic field generating unit that generates magnetic force lines in a certain direction.

12 Claims, 6 Drawing Sheets

(51) Int. Cl.
*H01M 10/0525* (2010.01)
*H01M 10/0585* (2010.01)

(56) References Cited

U.S. PATENT DOCUMENTS

| | | | | |
|---|---|---|---|---|
| 2011/0170233 | A1* | 7/2011 | Lee | H01G 9/016 |
| | | | | 361/502 |
| 2012/0154979 | A1* | 6/2012 | Signorelli | H01G 11/32 |
| | | | | 361/502 |
| 2013/0021719 | A1* | 1/2013 | Busch | B29C 47/0021 |
| | | | | 361/502 |
| 2013/0171500 | A1* | 7/2013 | Xu | H01G 9/02 |
| | | | | 429/145 |
| 2013/0177817 | A1* | 7/2013 | Noumi | H01G 11/52 |
| | | | | 429/246 |
| 2014/0030608 | A1* | 1/2014 | l'Abee | H01G 9/02 |
| | | | | 429/326 |
| 2016/0261008 | A1* | 9/2016 | Stefani | H01M 4/368 |

\* cited by examiner

ELECTRIC STORAGE DEVICE

INCORPORATION BY REFERENCE

The disclosure of Japanese Patent Application No. 2015-207783 filed on Oct. 22, 2015 including the specification, drawings and abstract, is incorporated herein by reference in its entirety.

BACKGROUND OF THE INVENTION

1. Field of the Invention

The present invention relates to an electric storage device.

2. Description of the Related Art

Examples of an electric storage device include a lithium ion capacitor, a lithium ion secondary battery, and so forth. For example, the lithium ion capacitor has an electrode body. The electrode body has a plurality of positive plates and a plurality of negative plates. The positive plates are prepared by applying a positive active material layer such as activated carbon to a positive collecting foil. The negative plates are prepared by applying a negative active material layer such as carbon to a negative collecting foil. The positive plates and the negative plates are alternately stacked on each other via separators. The separators are formed in a thin film shape from cellulose or the like. The electrode body is housed in a housing body together with an electrolytic solution to constitute the lithium ion capacitor. As an electric storage device that may achieve both a high capacity and a high output, development of the lithium ion capacitor to a variety of uses are expected. Development of the lithium ion capacitor to vehicles is also expected.

Japanese Patent Application Publication No. 6-84544 (JP 6-84544 A), for example, describes a lithium secondary battery that has a negative electrode, a positive electrode, an electrolytic solution interposed between the negative electrode and the positive electrode, and an electric double layer removal unit that at least partially removes an electric double layer that is present at the interface between the negative electrode and the positive electrode and the electrolytic solution. The electric double layer removal unit is composed of a pair of alternating magnetic field generating electromagnets that generate magnetic force lines in a direction that is orthogonal to a direction that connects the positive electrode and the negative electrode (corresponding to the stacking direction). An AC current is supplied from an oscillator to the pair of alternating magnetic field generating electromagnets to alternately change the direction of the magnetic force lines. The electrolytic solution is given a stirring effect by alternately changing the direction of the magnetic force lines to alternately change the direction of a force that acts on the electrolytic solution. The stirring effect given to the electrolytic solution breaks the electric double layer which is present at the interface of the electrodes, and reduces the internal resistance during charge/discharge of the lithium secondary battery to enable fast charging.

In the case where the electric storage device is applied to vehicles, it is necessary to assume that the electric storage device is used in a very wide temperature range from a cold district at about −40° C. to a hot district at about +50° C., for example. However, the electric storage device has a tendency that its internal resistance is increased as the temperature becomes lower (see the graph G2 in FIG. 11). For example, the internal resistance at an ambient temperature of about −40° C. may be equal to or more than 50 times the internal resistance at about 25° C. When the internal resistance is increased, the charge/discharge characteristics of the electric storage device may be degraded, which is not preferable.

The invention described in JP 6-84544 A is not intended to suppress a degradation in characteristics that occurs when the electric storage device is used at low temperatures.

SUMMARY OF THE INVENTION

An object of the present invention is to provide an electric storage device that can further improve the charge/discharge characteristics at relatively low temperatures by suppressing an increase in internal resistance at relatively low temperatures to suppress a degradation in charge/discharge characteristics at relatively low temperatures.

An aspect of the present invention provides an electric storage device that has an electrode body and a housing body. The electrode body has a plurality of positive plates and a plurality of negative plates. The positive plates and the negative plates are alternately stacked on each other via separators. The housing body houses the electrode body together with an ion conductor. The electric storage device is provided with a magnetic field generating unit that generates magnetic force lines in a certain direction.

With the electric storage device according to the aspect described above, it is possible to suppress an increase in internal resistance of the electric storage device using a magnetic field, and to significantly suppress an increase in internal resistance particularly at low temperatures (see FIG. 11). It is possible to further improve the charge/discharge characteristics of the electric storage device at relatively low temperatures by suppressing a degradation in charge/discharge characteristics of the electric storage device at relatively low temperatures. The present invention is achieved just by providing a magnetic field generating unit that generates magnetic force lines in a certain direction. Thus, the present invention can be easily implemented just by providing a simple magnetic field generating unit at an appropriate position.

In the electric storage device according to the aspect described above, the magnetic field generating unit may be disposed so as to generate magnetic force lines in a direction that is parallel to a direction in which the positive plates and the negative plates are stacked.

With the electric storage device according to the aspect described above, in which the direction of the magnetic force lines is parallel to the stacking direction, the magnetic force lines are allowed to uniformly penetrate the entirety of the positive plates and the negative plates so that the effect of the magnetic field is uniformly applied to the entirety of the positive plates and the negative plates. Thus, the charge/discharge characteristics of the electric storage device at relatively low temperatures can be further improved.

In the electric storage device according to the aspect described above, an electric double layer for physical charge/discharge may be formed.

With the electric storage device according to the aspect described above, in which an electric double layer for physical charge/discharge is formed, energy is stored through physical adsorption of ions, unlike secondary batteries etc. that store energy through a chemical reaction. Thus, the constituent materials of the electric storage device are hardly deteriorated, which makes it possible to extend the life of the electric storage device.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described below with reference to the drawings. In drawings in which the X axis, the Y axis, and the Z axis are indicated, the X axis, the Y axis, and the Z axis are orthogonal to each other. The Z-axis direction indicates the vertically upward direction. The X-axis direction indicates the direction of projection of a positive terminal and a negative terminal that project from an electric storage device. In the description of the embodiment, a lithium ion capacitor is described as an example of the electric storage device.

Figure 5:
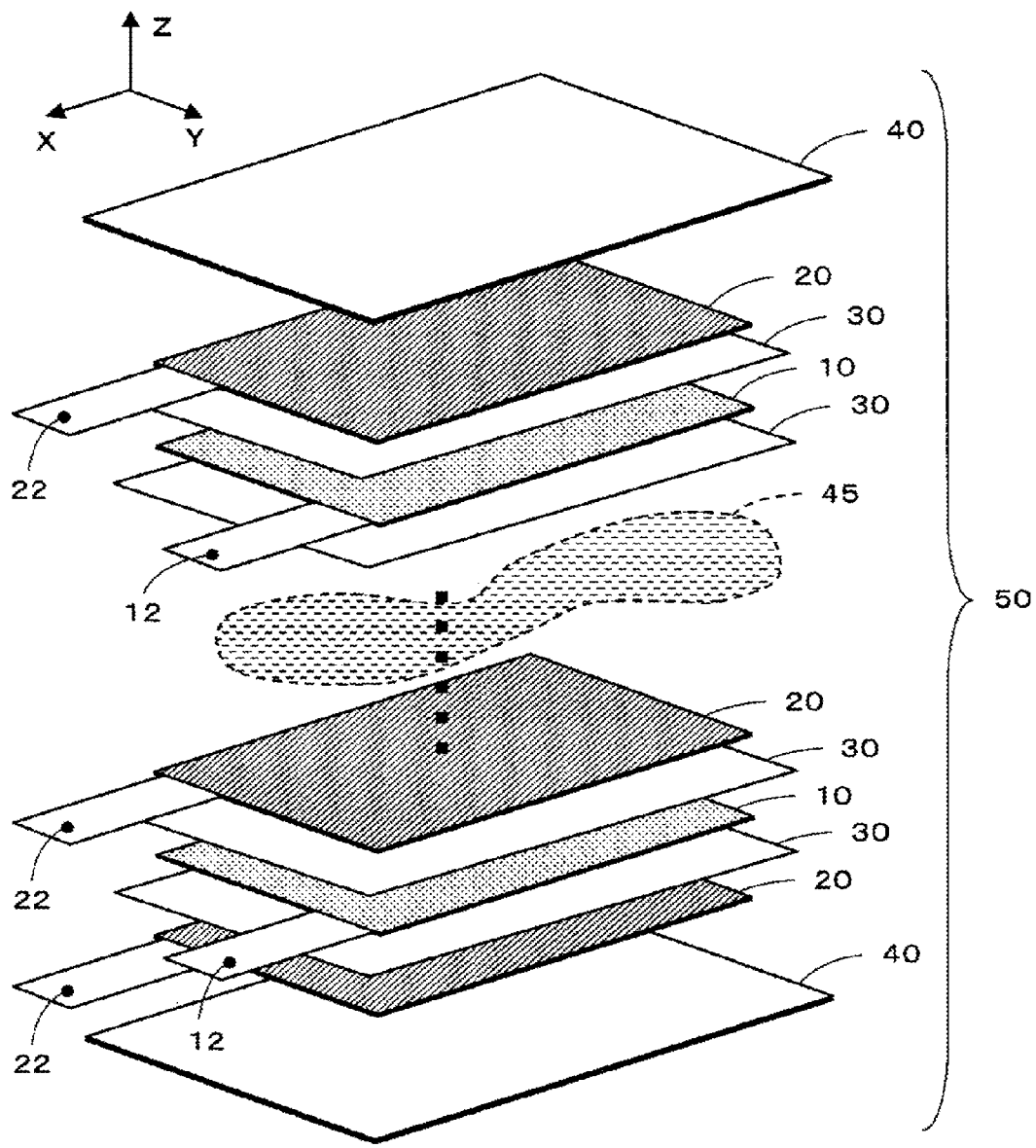
FIG. 5 is an exploded perspective view illustrating the structure of an electric storage device in which an electrode body, which is prepared by alternately stacking positive plates and negative plates via separators, is tightly sealed between laminating members together with an electrolytic solution.

In an electric storage device 50, as illustrated in FIG. 5, an electrode body which has a plurality of positive plates 10 and a plurality of negative plates 20 and in which the positive plates 10 and the negative plates 20 are alternately stacked on each other via separators 30 is tightly sealed as sandwiched between laminating members 40 together with an electrolytic solution (ion conductor) 45. In the following description, the electrolytic solution 45 is used as the ion conductor. However, the electric storage device 50 may be an all-solid-state battery in which the positive plates 10, the negative plates 20, and the ion conductor are all solid or the like. A tightly sealing container is not limited to stacking objects (laminates), and a metal container made of stainless steel, aluminum, or the like may also be used.

Figure 1:
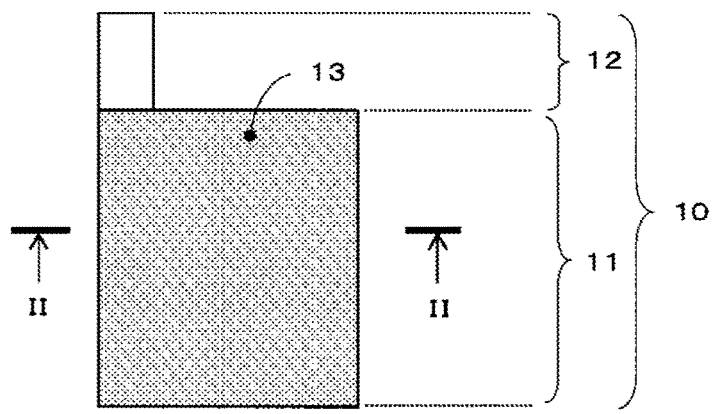
FIG. 1 illustrates an example of the appearance of a positive plate.
Figure 2:
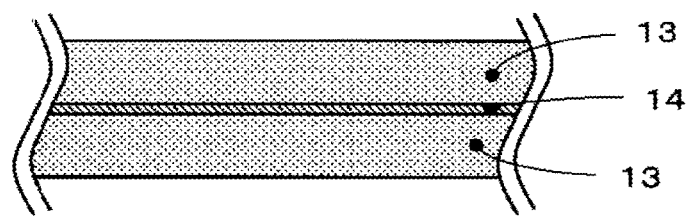
FIG. 2 is a sectional view taken along the line II-II of FIG. 1.

As illustrated in FIGS. 1 and 2, the positive plate 10 has a rectangular collecting portion 11 and a tab portion 12 provided so as to project from one end of one side (in the example of FIG. 1, the left end of the upper side) of the collecting portion 11. The positive plate 10 is formed with a positive active material layer 13 applied (held via a binder) to both surfaces of the collecting portion 11 in a collecting foil 14 formed from the integration of the collecting portion 11 and the tab portion 12. The collecting foil 14 is a metal foil made of aluminum, an aluminum alloy, or the like, for example. The positive active material layer 13 is formed from activated carbon or carbon nano tubes, for example, and contains a conduction assisting agent such as carbon black and a binder for binding formed from a polymer as a main component.

Figure 3:
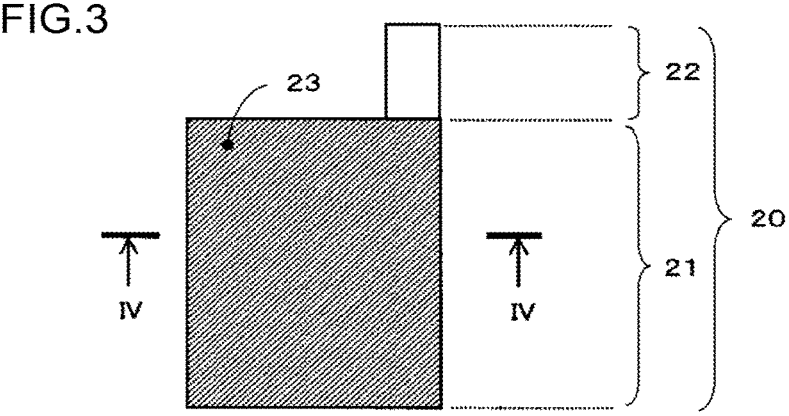
FIG. 3 illustrates an example of the appearance of a negative plate.
Figure 4:
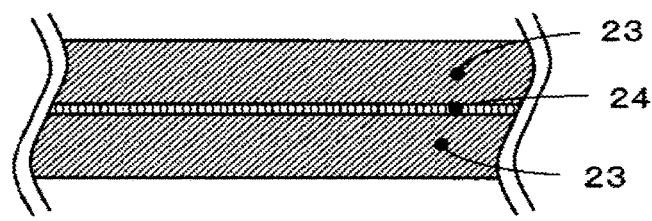
FIG. 4 is a sectional view taken along the line IV-IV of FIG. 3.

As illustrated in FIGS. 3 and 4, the negative plate 20 has a rectangular collecting portion 21 and a tab portion 22 provided so as to project from one end of one side (in the example of FIG. 3, the right end of the upper side) of the collecting portion 21. The negative plate 20 is formed with a negative active material layer 23 applied (held via a binder) to both surfaces of the collecting portion 21 in a collecting foil 24 formed from the integration of the collecting portion 21 and the tab portion 22. The collecting foil 24 is a metal foil made of copper, a copper alloy, nickel, stainless steel, or the like, for example. The negative active material layer 23 is formed from graphite, for example, and contains a conduction assisting agent and a binder that are similar to those for the positive active material layer.

The separator 30 is a so-called porous thin film that avoids direct contact between the positive plate 10 and the negative plate 20 and that has a large number of minute holes through which ions can pass and which hold the electrolytic solution. The separator 30 is formed to be somewhat larger than the collecting portion 11 of the positive plate 10 and the collecting portion 21 of the negative plate 20. The separator 30 is a polyolefin or cellulose microporous film, for example.

Figure 8:
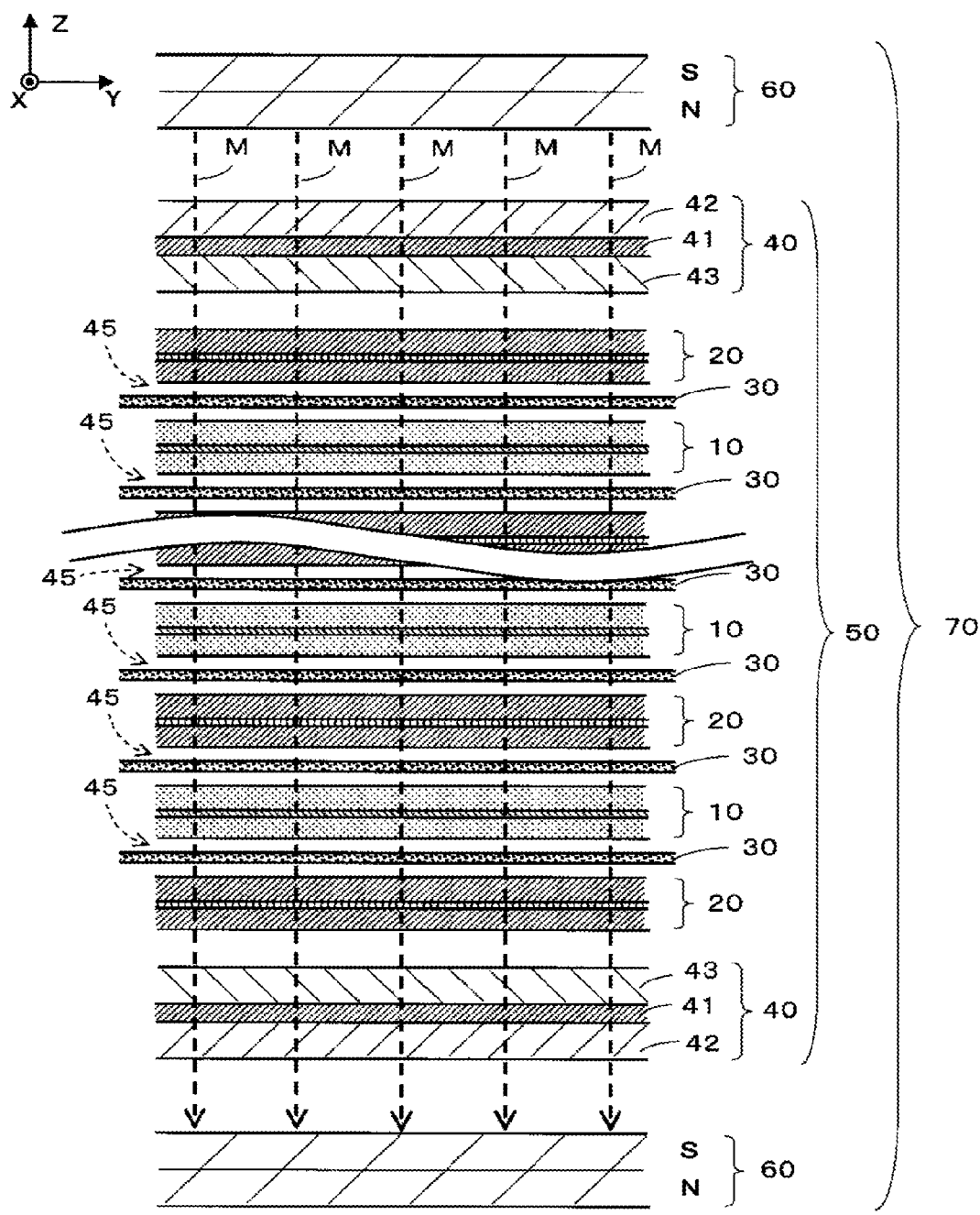
FIG. 8 is a sectional view taken along the line VIII-VIII of FIG. 7.

The laminating member 40 corresponds to the housing body. As illustrated in FIG. 8, an outer sheet 42 is bonded to the outer surface of a core material sheet 41, and an inner sheet 43 is bonded to the inner surface of the core material sheet 41. The core material sheet 41 is an aluminum foil, the outer sheet 42 is a resin material such as a nylon PET film, and the inner sheet 43 is a resin material such as polypropylene, for example.

Figure 6:
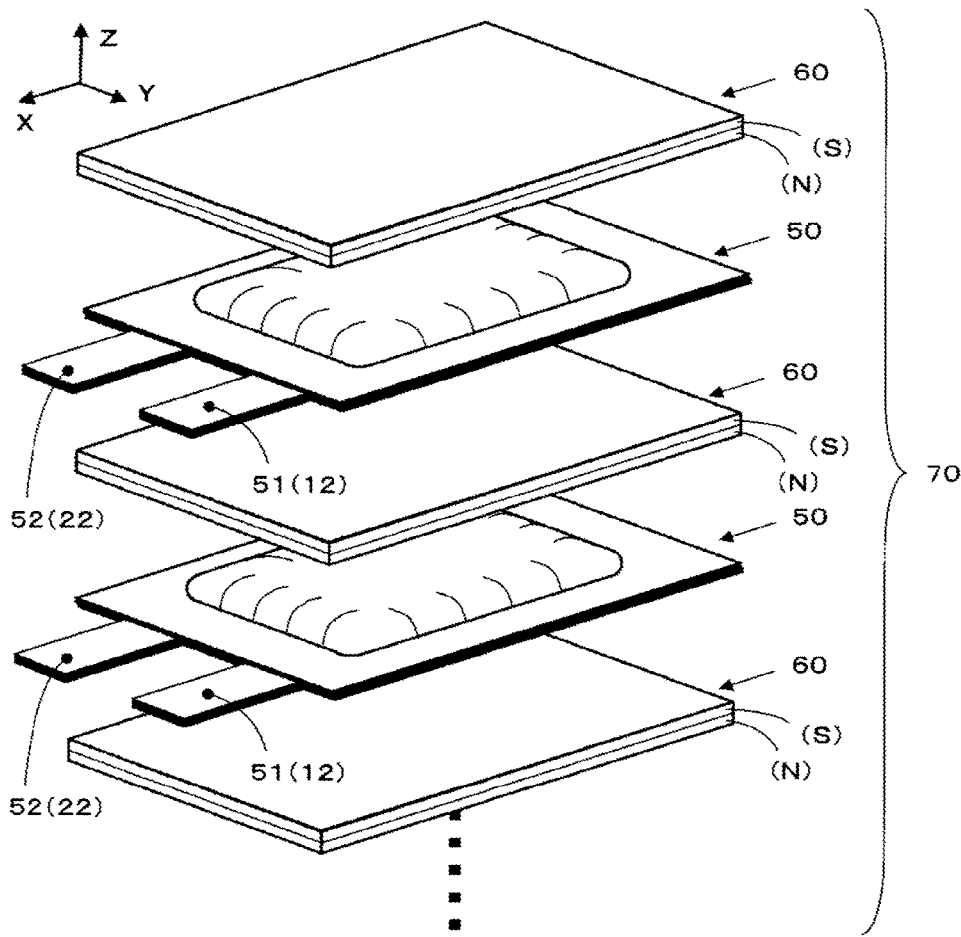
FIG. 6 is a perspective view illustrating how electric storage devices are provided with magnetic field generating units that generate magnetic force lines in a certain direction.

As illustrated in FIG. 5, one end of the electrode body, in which the positive plates 10 and the negative plates 20 are alternately stacked on each other via the separators 30, is constituted by the negative plate 20, and the other end of the electrode body is also constituted by the negative plate 20. The electrode body is sandwiched between the laminating members 40 together with the electrolytic solution 45. The laminating members 40 are welded to each other, for example, to tightly seal the electrode body and the electrolytic solution 45. The electrolytic solution 45 is composed of a solvent and an electrolyte. An organic solvent is used as the solvent. The electrolyte contains lithium salt that is ionizable into lithium ions and anions. As illustrated in FIG. 6, the tab portions 12 of the plurality of positive plates 10 are gathered to form a positive terminal 51, and the tab portions 22 of the plurality of negative plates 20 are gathered to form a negative terminal 52.

In order to use the electric storage device 50 described above for vehicles, a plurality of the electric storage devices 50 stacked on each other is used as an electric storage device stacked body. The electric storage devices 50 are stacked on each other together with magnetic field generating units 60.

Figure 7:
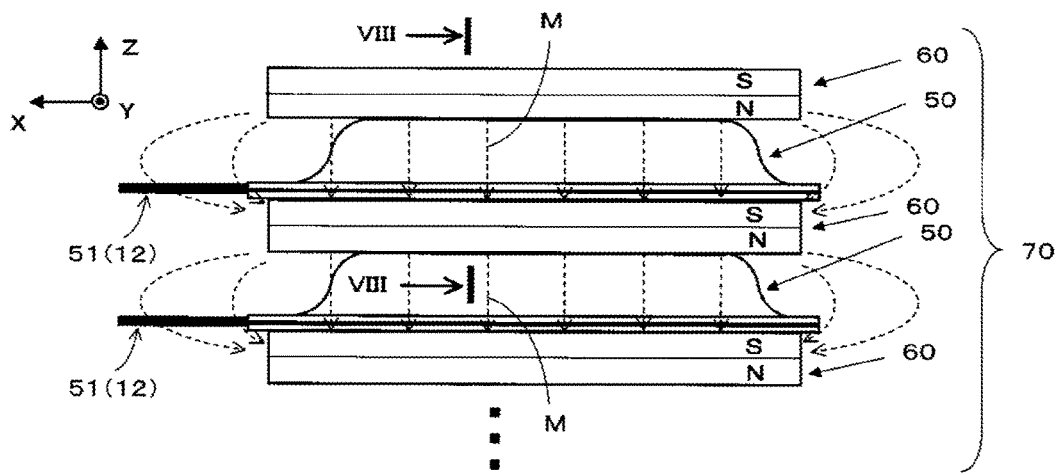
FIG. 7 is a side view illustrating how the electric storage devices and the magnetic field generating units are alternately stacked on each other.

As illustrated in FIGS. 6 and 7, for example, an electric storage device stacked body 70 is constituted by alternately stacking the magnetic field generating units 60, which generate magnetic force lines in a certain direction, and the electric storage devices 50.

The magnetic field generating unit 60 is a permanent magnet that generates magnetic force lines in a certain direction, for example. The magnetic field generating units 60 are provided on the outer surfaces of the electric storage devices 50 at one end and the other end in the stacking direction of the positive plates 10 and the negative plates 20 so as to sandwich the electric storage devices 50. That is, in the case where the stacking direction is defined as the up-down direction, the magnetic field generating units 60 are provided on the upper surface and the lower surface of the electric storage devices 50. A pair of magnetic field generating units 60 that sandwich an electric storage device 50 are provided such that the N pole of one of the magnetic field generating units 60 and the S pole of the other magnetic field generating unit 60 face each other. The magnetic field generating units 60 are preferably provided at positions away from the negative plates 20 where the magnetic field generating units 60 do not contact the negative plates 20. Providing the magnetic field generating units 60 at positions away from the negative plates 20 makes it possible to apply the magnetic force lines not only to the surfaces of the negative plates 20 but also to the electrolytic solution, the positive plates, and so forth.

As illustrated in FIGS. 7 and 8, magnetic force lines M indicated by dotted lines extend from the N pole to the S pole, and are directed, with respect to the electric storage devices 50, in parallel with the direction in which the positive plates 10 and the negative plates 20 are stacked on each other in the electric storage devices 50. According to an experiment conducted by the inventor using a gauss meter, it was found that the magnetic force lines M penetrated the metal foils of the laminating members 40, the positive plates 10, and the negative plates 20. In FIG. 8, for ease of understanding, a gap is provided between the members in the electric storage device 50. In practice, however, there is almost no gap. The separators 30 are sandwiched between the positive plates 10 and the negative plates 20 with almost no gap, and the electrolytic solution 45 is held in the minute holes of the separators 30.

Figure 9:
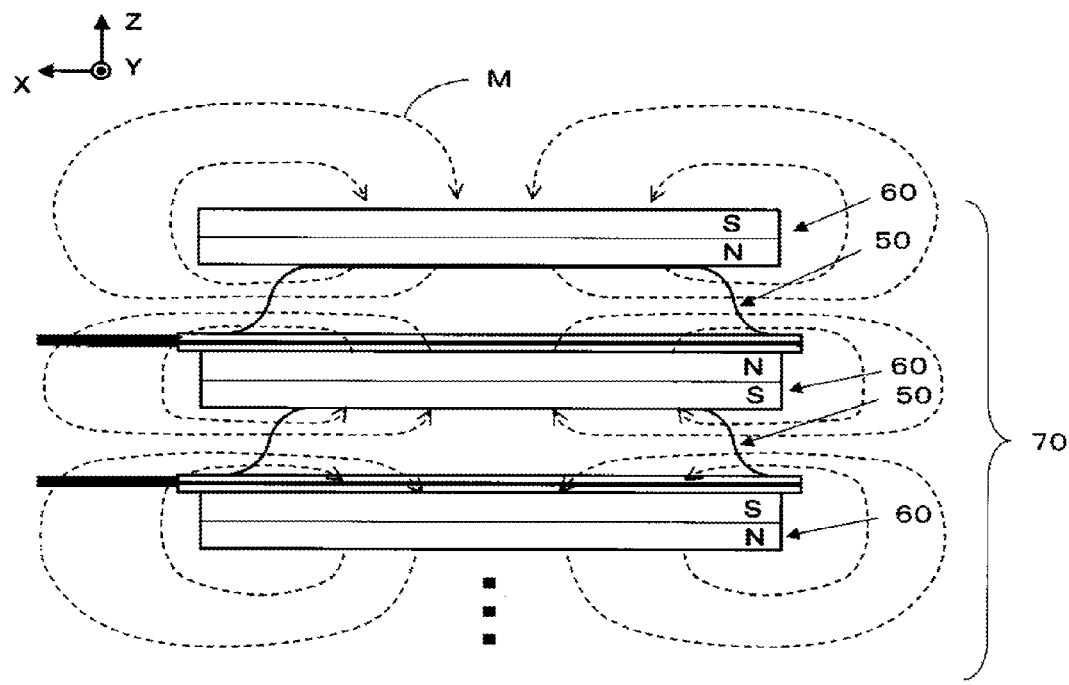
FIG. 9 illustrates an example in which the directions of the magnetic force lines with respect to the electric storage devices are changed.

As illustrated in FIG. 9, a pair of magnetic field generating units 60 that sandwich an electric storage device 50 may be provided such that the N poles, or the S poles, face each other. Also in this case, as in the case illustrated in FIG. 7, the effect of the magnetic force lines M can be applied to the electrode body in the electric storage device 50. In this case, however, there is a region penetrated by almost no magnetic force lines in the vicinity of the center of the electric storage device 50, and it is difficult to cause the magnetic force lines to uniformly penetrate the electrode body in the electric storage device 50. Thus, the configuration in which the magnetic force lines M penetrate parallel to the stacking direction of the electrode body is more preferable than the configuration illustrated in FIG. 9, because the magnetic force lines uniformly penetrate the entirety of the positive plates and the negative plates so that the effect of the magnetic field can be uniformly applied to the entirety of the positive plates and the negative plates.

Figure 10:
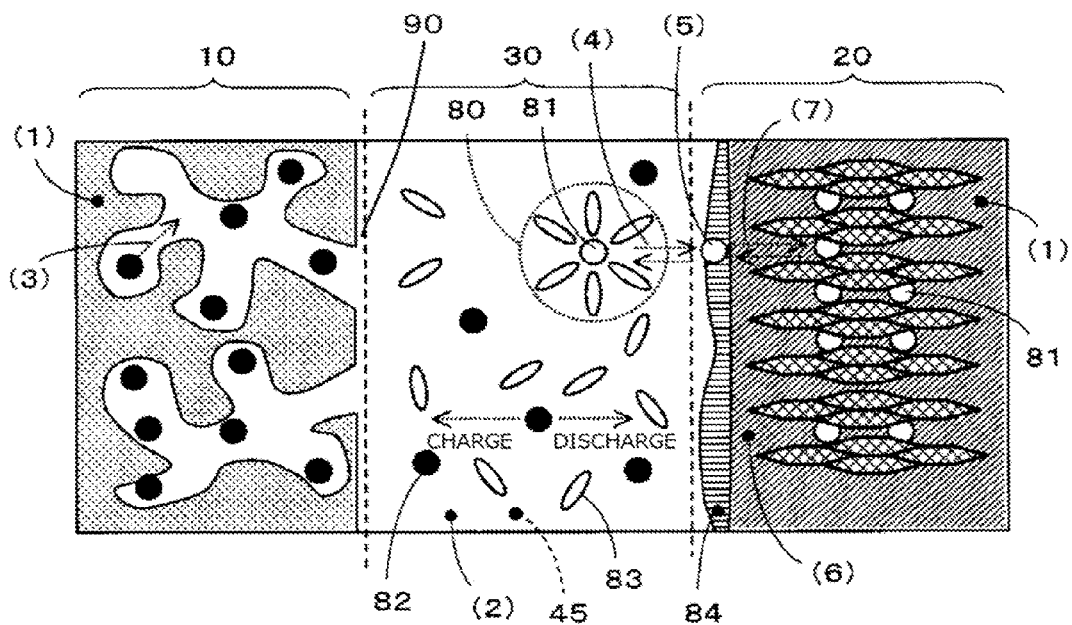
FIG. 10 illustrates the effect of a magnetic field.

Next, the effect of the magnetic field generated by the magnetic force lines M will be described in (1) to (7) below with reference to FIG. 10, the (1) to (7) being also indicated in FIG. 10. In FIG. 10, reference numeral 80 indicates a solvation, 81 denotes a lithium ion (cation), 82 denotes an electrolyte ion (anion), 83 denotes a solvent molecule, and 84 denotes a solid electrolyte film.

(1) The electrical conductivity of an active material layer, a conduction assisting agent (contained in the active material layer), a metal foil, and so forth is increased.

(2) The ion conductivity of the electrolytic solution 45 is increased.

(3) The speed at which the electrolytic solution, the lithium ion 81 (cation), and the electrolyte ion 82 (anion) move in the minute holes of the activated carbon (positive active material layer) is increased.

(4) The energy required for a reaction in which the lithium ion 81 is eliminated from the solvation 80 in the electrolytic solution and a reaction in which the lithium ion 81 released from the negative plate 20 is received to form the solvation 80 again is reduced (the energy required for elimination/formation of the solvation is reduced) to increase the reaction speed.

(5) The speed at which the lithium ion 81 passes through the solid electrolyte film 84 is increased.

(6) A space between a layer and a layer of hexagonal plate-like crystals of graphite (negative active material layer) is aligned with a direction toward the positive plate 10 to increase the reaction speed, which is the insertion speed and the elimination speed of the lithium ion 81.

(7) The lithium ion 81, which has passed through the solid electrolyte film 84 to the negative plate 20, is immediately diffused in the direction inwardly of the graphite to improve the acceptability of the lithium ion 81 to increase the reaction speed, which is the insertion speed and the elimination speed of the lithium ion 81.

In the lithium ion capacitor, an electric double layer (a phenomenon in which charges are oriented at a very short distance from the interface between an electrolytic solution and an electrode; in this case, on the positive electrode side of the electrolytic solution) is formed with respect to the positive plate 10 to enable polarization when an electric field is applied, and physical charge/discharge is performed using the electric double layer to allow fast charge/discharge compared to the lithium ion battery. The physical charge/discharge refers to physical storage of charges on the surface of the activated carbon of the positive plate and release. In this way, energy is stored through physical adsorption of ions on the surface of the activated carbon of the positive plate, unlike secondary batteries etc. that store energy through a chemical reaction. Thus, the constituent materials of the lithium ion capacitor are hardly deteriorated, which makes it possible to extend the life of the lithium ion capacitor. Application of a magnetic field during charge/discharge generates a Lorentz force or the like at a portion (such as the positive plate or the negative plate) divided by the electric double layer, which enables ions to move quickly and makes it possible to improve the charge/discharge characteristics. In particular, when a magnetic field acts on the positive plate (a Lorentz force or the like is generated), ions in the electrolytic solution are attracted, which enables the ions to be diffused quickly in the pores of the activated carbon and makes it possible to further improve the charge/discharge characteristics. Also in the case where pores are also formed in the negative plate, ions are similarly quickly diffused to further improve the charge/discharge characteristics. Application of a magnetic field to a capacitor or the like that forms the electric double layer for the positive plate or the negative plate (in the electrolytic solution) as well as the lithium ion capacitor can similarly improve the charge/discharge characteristics.

Figure 11:
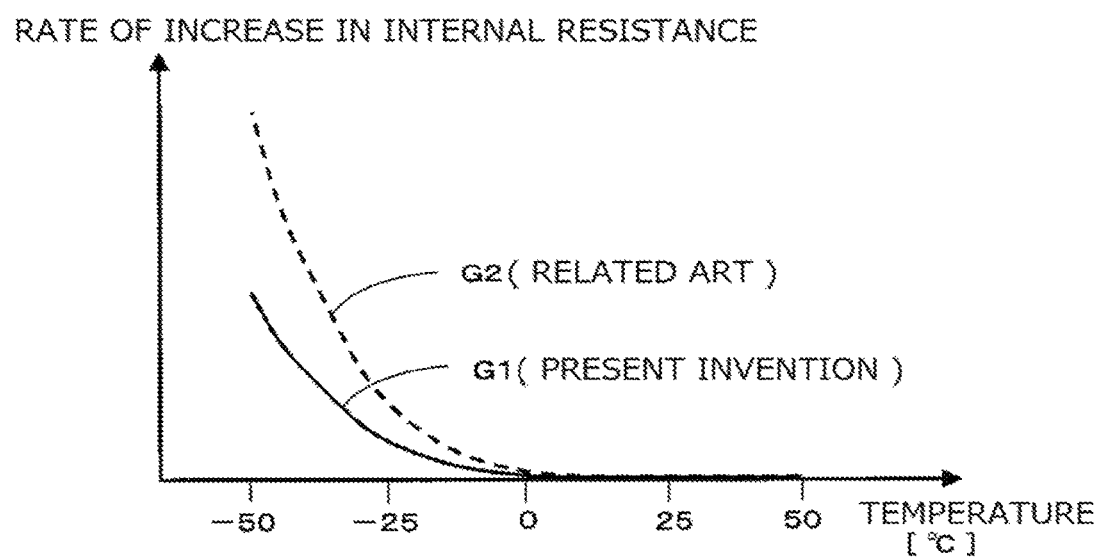
FIG. 11 illustrates the effect of the magnetic force lines suppressing the rate of increase in internal resistance of the electric storage device.

FIG. 11 is a graph in which the horizontal axis indicates the temperature (ambient temperature) [° C.] and the vertical axis indicates the rate of increase in internal resistance of the electric storage device 50. A graph G1 indicated by the solid line indicates the characteristics of the electric storage device according to the embodiment which is provided with the magnetic field generating units. A graph G2 indicated by the dotted line indicates the characteristics of an electric storage device according to the related art which is not provided with the magnetic field generating units. As seen from the graphs G1 and G2, with the embodiment which is provided with the magnetic field generating units, it is possible to suppress the rate of increase in internal resistance with respect to the temperature to about half that according to the related art at low temperatures equal to or lower than 0° C. That is, it is possible to further improve the charge/discharge characteristics of the electric storage device at relatively low temperatures by further suppressing a degradation in charge/discharge characteristics at relatively low temperatures.

The electric storage device according to the present invention is not limited to the structure, the configuration, the appearance, the shape, and so forth described in relation to the embodiment, and various modifications, additions, and deletions may be made thereto without departing from the scope and spirits of the present invention.

In the description of the embodiment, the lithium ion capacitor is used as an example of the electric storage device. However, the present invention is not limited to the lithium ion capacitor, and may be applied to a variety of electric storage devices such as a lithium ion secondary battery, an electric double layer capacitor, and an all-solid-state battery.

In the description of the embodiment, the permanent magnets which serve as the magnetic field generating units 60 which generate a magnetic field in a certain direction are provided on the outer surface of the electric storage device. However, the permanent magnets may be provided in the electric storage device. Alternatively, a magnetic field in a certain direction may be generated using a coil and a power source in place of the permanent magnets, or magnetic powder may be mixed in the electric storage device. In the case where magnetic powder is mixed in the electric storage device, the magnetic field in a certain direction means that the direction of a magnetic field generated by the magnetic powder is not varied but fixed, rather than the direction of a magnetic field generated by the magnetic powder is the same.

What is claimed is:

1. An electric storage device comprising:
an electrode body that has a plurality of positive plates and a plurality of negative plates, the positive plates and the negative plates being alternately stacked on each other via separators; and
a housing body that houses the electrode body together with an ion conductor, wherein
the electric storage device is provided with a magnetic field generating unit that generates magnetic force lines in a certain direction,
each of the positive plates includes a positive active material applied to both surfaces of a collecting foil.

2. The electric storage device according to claim 1, wherein the magnetic field generating unit is disposed so as to generate magnetic force lines in a direction that is parallel to a direction in which the positive plates and the negative plates are stacked.

3. The electric storage device according to claim 1, wherein an electric double layer for physical charge/discharge is formed.

4. The electric storage device according to claim 3, wherein the magnetic field generating unit is disposed such that a magnetic field acts on ions in porous portions of the positive plates formed as divided by the electric double layer during the charge/discharge.

5. The electric storage device according to claim 3, wherein the magnetic field generating unit is disposed such that a magnetic field acts on ions in surface portions of the negative plates formed as divided by the electric double layer during the charge/discharge.

6. The electric storage device according to claim 1, wherein the magnetic field generating unit is disposed outside of the housing body with respect to the electrode body.

7. The electric storage device according to claim 1, wherein
a topmost plate of the electrode body is a negative plate, and
a bottommost plate of the electrode body is a negative plate.

8. The electrode storage device according to claim 1, wherein the separators have holes which hold the ion conductor.

9. An electric storage device comprising:
an electrode body that has a plurality of positive plates and a plurality of negative plates, the positive plates and the negative plates being alternately stacked on each other via separators; and
a housing body that houses the electrode body together with an ion conductor, wherein
the electric storage device is provided with a magnetic field generating unit that generates magnetic force lines in a certain direction, and
each of the negative plates includes a negative active material applied to both surfaces of a collecting foil.

10. An electric storage device comprising:
an electrode body that has a plurality of positive plates and a plurality of negative plates, the positive plates and the negative plates being alternately stacked on each other via separators; and
a housing body that houses the electrode body together with an ion conductor, wherein
the electric storage device is provided with a magnetic field generating unit that generates magnetic force lines in a certain direction, and
the magnetic field generating unit includes a permanent magnet.

11. The electrode storage device according to claim 10, wherein the permanent magnet includes two permanent magnets that sandwich the housing body.

12. The electrode storage device according to claim 11, wherein the two permanent magnets are disposed such that a north pole of one of the two permanent magnets faces a south pole of the other of the two permanent magnets.

* * * * *